(12) United States Patent
Kudo et al.

(10) Patent No.: US 10,614,399 B2
(45) Date of Patent: Apr. 7, 2020

(54) WORK DATA MANAGEMENT SYSTEM AND WORK DATA MANAGEMENT METHOD

(71) Applicant: HITACHI, LTD., Tokyo (JP)

(72) Inventors: Yasuyuki Kudo, Tokyo (JP); Noriyuki Haga, Tokyo (JP); Satoshi Katsunuma, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 135 days.

(21) Appl. No.: 15/913,957

(22) Filed: Mar. 7, 2018

(65) Prior Publication Data

US 2019/0012621 A1    Jan. 10, 2019

(30) Foreign Application Priority Data

Jul. 7, 2017    (JP) .................................. 2017-134002

(51) Int. Cl.
*G06Q 10/06* (2012.01)
*G06T 11/20* (2006.01)

(52) U.S. Cl.
CPC ... *G06Q 10/0633* (2013.01); *G06Q 10/06395* (2013.01); *G06Q 10/063114* (2013.01); *G06T 11/206* (2013.01)

(58) Field of Classification Search
CPC .......... G06Q 10/0633; G06Q 10/0639; G06Q 10/063114; G06T 11/206
See application file for complete search history.

(56) References Cited

U.S. PATENT DOCUMENTS

| | | | | |
|---|---|---|---|---|
| 5,974,992 A * | 11/1999 | Asano | ...................... | D05C 5/06 112/102.5 |
| 2006/0031840 A1* | 2/2006 | Yigit | ..................... | G06F 9/5088 718/102 |
| 2010/0001994 A1* | 1/2010 | Kim | .................... | G06K 9/00335 345/419 |
| 2012/0004887 A1 | 1/2012 | Kawaguchi et al. | | |
| 2012/0045149 A1* | 2/2012 | Arai | ....................... | H04N 7/183 382/296 |
| 2012/0308140 A1 | 12/2012 | Ambrus et al. | | |
| 2013/0174101 A1* | 7/2013 | Han | ........................ | G06F 3/011 715/863 |
| 2013/0271458 A1* | 10/2013 | Andriluka | .......... | G06K 9/00342 345/420 |
| 2013/0301882 A1 | 11/2013 | Kawaguchi et al. | | |
| 2014/0270482 A1* | 9/2014 | Chakraborty | ...... | G06K 9/00221 382/154 |
| 2015/0145762 A1 | 5/2015 | Shimura | | |

(Continued)

FOREIGN PATENT DOCUMENTS

| | | | |
|---|---|---|---|
| JP | 2005-346614 A | | 12/2005 |
| JP | 2011164694 A | * | 8/2011 |

(Continued)

OTHER PUBLICATIONS

Chandoo, "Gantt Box Chart Tutorial & Template—Download and Try today", Jul. 9, 2010, Chandoo.org, https://chandoo.org/wp/gantt-box-chart-tutorial-template/ (Year: 2010).*

(Continued)

*Primary Examiner* — Mehmet Yesildag
(74) *Attorney, Agent, or Firm* — Mattingly & Malur, PC

(57) ABSTRACT

There is provided a work data management system which includes a detailed step classification unit that classifies work performed by a worker at a work site into a plurality of time-series detailed steps based on work data including image data of the work site and a data visualization unit that causes a result display unit to display at least the image data and the plurality of time-series detailed steps.

11 Claims, 11 Drawing Sheets

(56) References Cited

U.S. PATENT DOCUMENTS

| | | | |
|---|---|---|---|
| 2015/0288923 A1* | 10/2015 | Kim | H04N 5/23296 |
| | | | 348/14.05 |
| 2015/0310629 A1 | 10/2015 | Utsunmiya et al. | |
| 2016/0012379 A1* | 1/2016 | Iwai | G06Q 30/0601 |
| | | | 705/7.15 |
| 2016/0127657 A1 | 5/2016 | Mukai et al. | |
| 2016/0239769 A1* | 8/2016 | Modi | G06Q 10/0633 |
| 2016/0253618 A1* | 9/2016 | Imazawa | G06T 7/73 |
| | | | 705/7.15 |
| 2017/0061631 A1* | 3/2017 | Karasudani | G06T 1/0007 |

FOREIGN PATENT DOCUMENTS

| | | | | |
|---|---|---|---|---|
| JP | 2011-191836 A | 9/2011 | | |
| WO | WO-2017175360 A1 * | 10/2017 | | G05D 1/0276 |

OTHER PUBLICATIONS

Extended European Search Report received in corresponding European Application No. 18160478.6 dated May 23, 2018.

"Computer Vision", Wikipedia Internet Article, May 15, 2017, URL: https://en.wikipedia.org/w/index.php?title=Computer_vision&oldid=780534539.

Moeslund, T. B. et al., "Visual Analysis of Humans: Looking at People", Oct. 8, 2011, Chapters 1, 6, 8-18, 23, 25-27 and 30.

Coupete, E. et al., "Gesture Recognition Using a Depth Camera for Human Robot Collaboration on Assembly Line", Procedia Manufacturing, Jul. 30, 2015, pp. 518-525, vol. 3.

"Enhanced Drivers License", Wikipedia Internet Article, Jun. 28, 2017, URL: https://en.wikipedia.org/w/index.php?title=Enhanced_Drivers_license&oldid=787869010.

* cited by examiner

FIG. 2

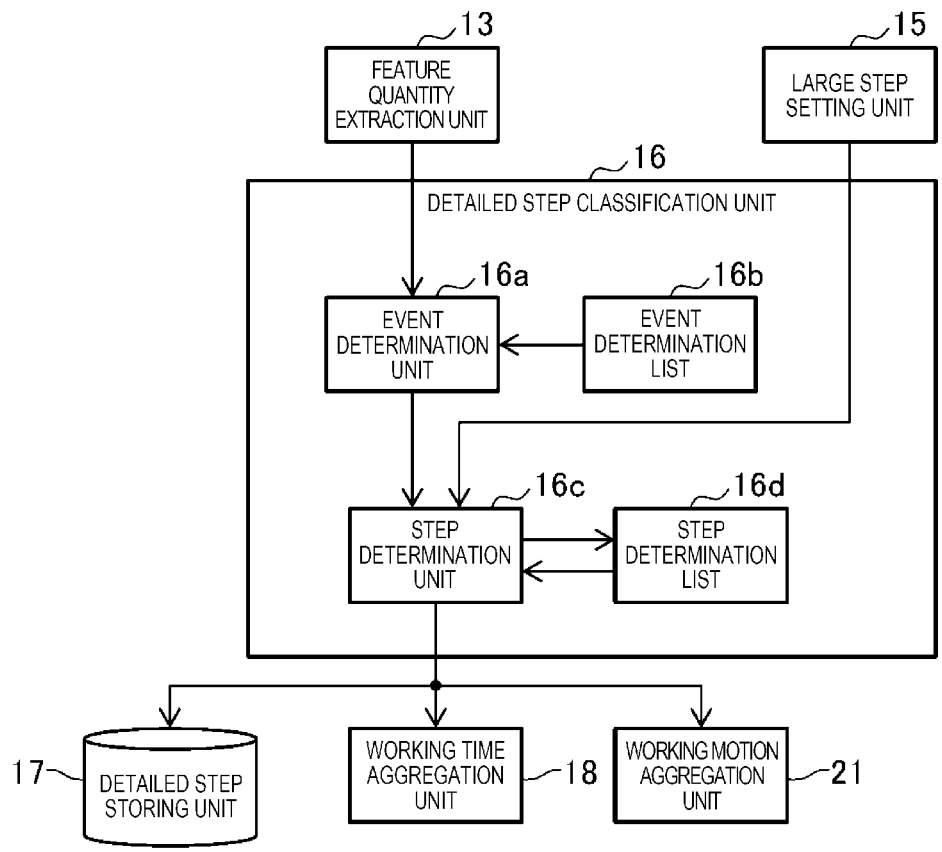

FIG. 3

| # | HEAD POSITION α | HAND POSITION β | LOGICAL EXPRESSION | DURATION | DETERMINATION CONTENT |
|---|---|---|---|---|---|
| E1 | X: 75(±50)<br>Y: 240(±50) | X: 320(±100)<br>Y: 200(±50) | α & β | 1 SECOND | STAY NEAR PROCESSING MACHINE |
| E2 | X: 75(±50)<br>Y: 240(±50) | X: 150(±50)<br>Y: 100(±50) | α & β | 1 SECOND | REACHED FOR LEFT SWITCH |
| E3 | X: 75(±50)<br>Y: 240(±50) | X: 450(±50)<br>Y: 100(±50) | α & β | 1 SECOND | REACHED FOR RIGHT LEVER |
| E4 | X: 200(±50)<br>Y: 240(±50) | ABSENCE | α & β | 0.5 SECONDS | PASS THROUGH PASSAGE |
| E5 | X: 365(±50)<br>Y: 240(±50) | ABSENCE | α & β | 1 SECOND | STAY IN INSPECTION AREA |
| ⋮ | ⋮ | ⋮ | ⋮ | ⋮ | ⋮ |
| Ez | IT DOES NOT FALL UNDER ANY OF MATTERS DESCRIBED ABOVE | | | 10 SECONDS | UNCLASSIFIED |

| # | LARGE STEP γ | EVENT δ | LOGICAL EXPRESSION | DURATION | DETERMINATION CONTENT |
|---|---|---|---|---|---|
| A1 | PROCESSING | EVENT E2 OCCURS WITHIN 10 SECONDS AFTER E1 OCCURS | γ & δ | 1 SECOND | SET MEMBER IN PROCESSING MACHINE |
| A2 | | EVENT E3 OCCURS WITHIN 10 SECONDS AFTER E2 IS ENDED | γ & δ | 1 SECOND | PERFORM DRILLING |
| M1 | | EVENT E4 OCCURS WITHIN 10 SECONDS AFTER E3 OCCURS | γ & δ | 0.5 SECONDS | MOVE WITH HOLDING MEMBER |
| B1 | | EVENT E5 OCCURS WITHIN 10 SECONDS AFTER E4 OCCURS | γ & δ | 1 SECOND | DIMENSION INSPECTION OF MEMBER |
| ⋮ | ⋮ | ⋮ | ⋮ | ⋮ | ⋮ |
| Zz | IT DOES NOT FALL UNDER ANY OF MATTERS DESCRIBED ABOVE | | | 10 SECONDS | UNCLASSIFIED |

FIG. 5

| DATE | TIME | DETAILED STEP | DURATION | HEAD POSITION | HAND POSITION |
|---|---|---|---|---|---|
| MARCH 1 | 8:30':15"11 | A1 | 1':15"33 | (80, 220) | (125, 110) |

FIG. 9

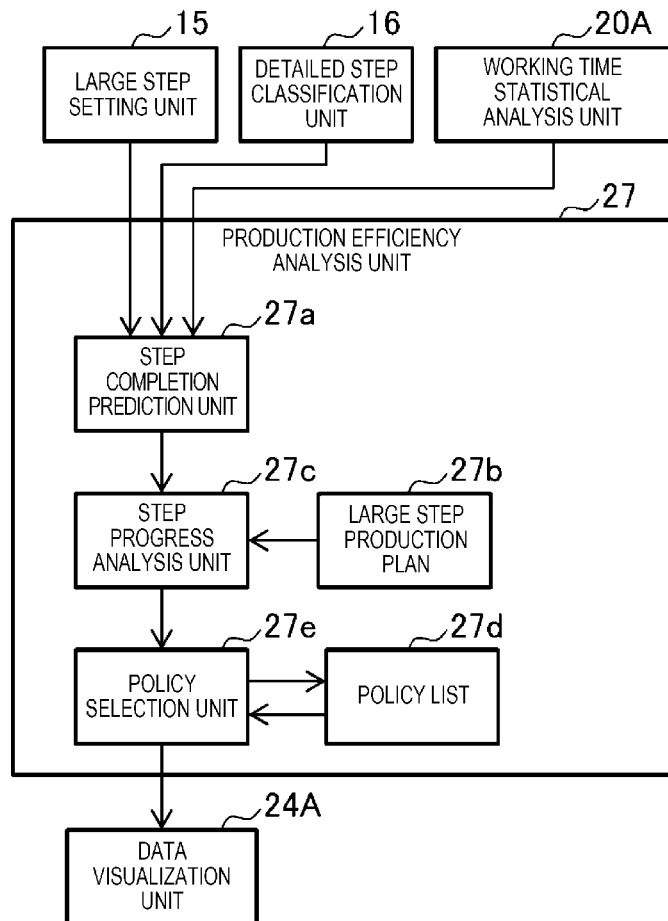

FIG. 10

| LEVEL | DELAY DATA | POLICY |
|---|---|---|
| H2 | GREATER THAN OR EQUAL TO -3 MINUTES | · WORKER: CONTACT SUPERVISOR<br>· MANAGER: INSTRUCT SUPPORT FOR OTHER STEPS, SMALL BREAK OR THE LIKE |
| H1 | GREATER THAN OR EQUAL TO -1 MINUTE | · WORKER: THOROUGH CHECK OF WORK |
| N0 | GREATER THAN OR EQUAL TO ±1 MINUTE | · WORKER: PROCEED WITH WORK SO FAR |
| L1 | LESS THAN +1 MINUTE | · WORKER: WORK AT A SLIGHTLY FASTER PACE |
| L2 | GREATER THAN OR EQUAL TO +3 MINUTES | · WORKER: CONTACT MANAGER<br>· MANAGER: INSTRUCT OTHER WORKERS TO SUPPORT |
| L3 | GREATER THAN OR EQUAL TO +10 MINUTES | · MANAGER: RESET PRODUCTION PLAN |

| LARGE STEP | ITEM | HEAD POSITION | HAND POSITION | AVERAGE ELAPSED TIME |
|---|---|---|---|---|
| PROCESSING | START | X: 75(±50)<br>Y: 240(±50) | X: 320(±100)<br>Y: 200(±50) | 0':00"00 |
| | COMPLETION | X: 615(±25)<br>Y: 240(±25) | ABSENCE | 1':25"05 |
| ASSEMBLY | START | X: 320(±50)<br>Y: 50(±50) | X: 320(±100)<br>Y: 240(±50) | 1':35"25 |
| | COMPLETION | X: 320(±50)<br>Y: 430(±50) | ABSENCE | 3':15"40 |

WORK DATA MANAGEMENT SYSTEM AND WORK DATA MANAGEMENT METHOD

TECHNICAL FIELD

The present invention relates to a work data management system and a work data management method.

BACKGROUND ART

At a work site where a product is manufactured, it is required to identify and solve problems on a daily basis in order to improve production efficiency and quality of a product. Meanwhile, with the development of information technology (IT), analysis of large-scale data is proceeding, in addition to integrated management and visualization of data sensed at the work site. For example, at the work site where a predetermined member is processed in a plurality of steps before a single product is completed, it is required to grasp work processes up to completion and shipment of the product, that is, to enhance traceability. As techniques related to such traceability, for example, techniques described in PTLs 1 and 2 are known.

That is, in JP-A-2005-346614, steps such as "an IC tag is attached to a moving container, . . . , an IC tag reading device is arranged at each of an input port and an output port in a manufacturing step, and an ID of the moving container is read by the IC tag reading device" are described.

In JP-A-2011-191836, steps such as "data of each acceleration sensor worn by a worker and data of a position sensor are read out and operation contents of the worker, . . . , is specified according to each composite acceleration value and acceleration component value" are described.

However, in the technique described in JP-A-2005-346614, although traceability related to products can be improved, it is difficult for an administrator to grasp details of the contents of work by a worker.

In the technique described in JP-A-2011-191836, the worker needs to wear an acceleration sensor and a position sensor and thus, there is a circumstance that it takes time and effort that much.

SUMMARY OF THE INVENTION

Accordingly, an object of the present invention is to provide a work data management system or the like capable of easily grasping contents of work at a work site.

In order to solve the problems described above, a work data management system of the present invention includes a detailed step classification unit that classifies work performed by a worker at a work site into a plurality of time-series detailed steps based on work data including image data of the work site and a data visualization unit that causes a display unit to display at least the image data and the plurality of time-series detailed steps.

According to the present invention, it is possible to provide a work data management system or the like capable of easily grasping work contents at a work site.

BRIEF DESCRIPTION OF THE DRAWINGS

FIG. 2 is a functional block diagram of a detailed step classification unit included in the work data management system according to the first embodiment of the present invention.

FIG. 3 is an explanatory table of an event determination list of the detailed step classification unit included in the work data management system according to the first embodiment of the present invention.

FIG. 4 is an explanatory table of a step determination list of the detailed step classification unit included in the work data management system according to the first embodiment of the present invention.

FIG. 5 is an explanatory table illustrating an example of working motion data generated by a working motion aggregation unit included in the work data management system according to the first embodiment of the present invention.

FIG. 9 is a functional block diagram of a production efficiency analysis unit included in the work data management system according to the second embodiment of the present invention.

FIG. 10 is an explanatory table of a policy list of the production efficiency analysis unit included in the work data management system according to the second embodiment of the present invention.

DETAILED DESCRIPTION OF THE INVENTION

First Embodiment
Configuration of Work Data Management System

Figure 1:
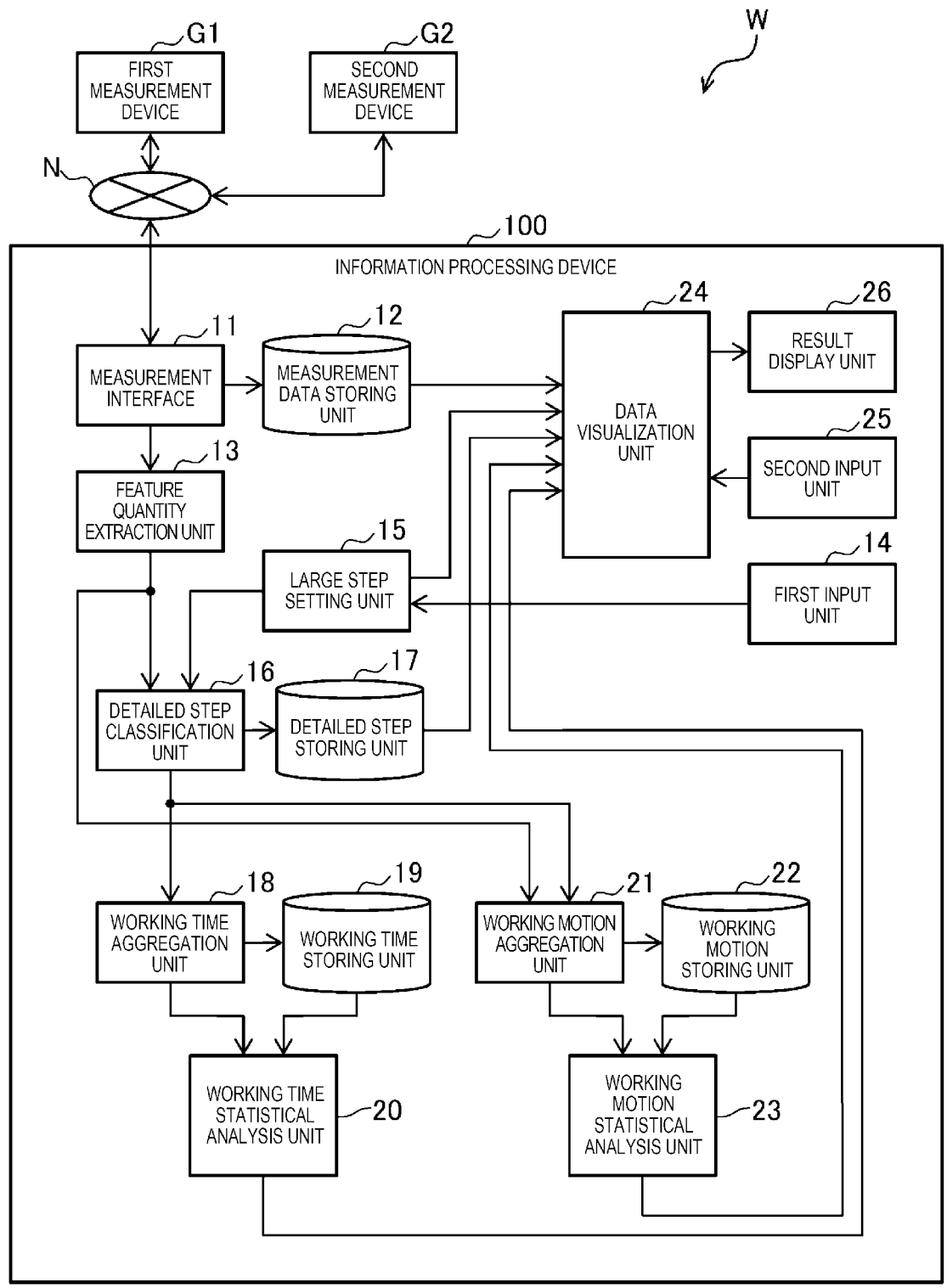
FIG. 1 is a functional block diagram illustrating a configuration of a work data management system according to a first embodiment of the present invention.

FIG. 1 is a functional block diagram illustrating a configuration of a work data management system W according to a first embodiment.

The work data management system W illustrated in FIG. 1 is a system for managing data (referred to as work data) relating to work at a work site. In the first embodiment, in order to manufacture a predetermined product, a state in which a worker repeatedly performs predetermined work (processing of a member and the like) is photographed and analysis and display of work are performed based on the photographed result. The member described above may be substantially similar to the finished product or may be a component of the finished product.

As illustrated in FIG. 1, the work data management system W includes a first measurement device G1, a second measurement device G2, and an information processing device 100.

The first measurement device G1 and the second measurement device G2 are devices that acquire sensing data used for analysis by the information processing device 100. The first measurement device G1 is a network camera for capturing movement of a worker in a wide range (that is, photographing a distant view), and is installed at a work site. The second measurement device G2 is a network camera for capturing detailed movement of the worker (that is, photographing a near view), and is installed at the work site. The first measurement device G1 and the second measurement device G2 transmit a momentary photographed result to the information processing device 100 via a network N based on a predetermined communication protocol. The network N is, for example, a local area network (LAN).

Although not illustrated, the information processing device 100 is configured to include an electronic circuit such as a central processing unit (CPU), a read only memory (ROM), a random access memory (RAM), various interfaces, and the like. Thus, a program stored in the ROM is read out and developed in the RAM and the CPU executes various processing.

The information processing device 100 is a device that analyzes work by a worker based on image data received from the first measurement device G1 and the second measurement device G2 and displays the analysis result.

As illustrated in FIG. 1, the information processing device 100 includes a measurement interface 11, a measurement data storing unit 12, a feature quantity extraction unit 13, a first input unit 14, a large step setting unit 15, a detailed step classification unit 16, and a detailed step storing unit 17.

In addition to the configuration described above, the information processing device 100 further includes a working time aggregation unit 18, a working time storing unit 19, a working time statistical analysis unit 20, a working motion aggregation unit 21, a working motion storing unit 22, and a working motion statistical analysis unit 23. Further, the information processing device 100 includes a data visualization unit 24, a second input unit 25, and a result display unit 26 (display unit).

The measurement interface 11 captures time-series image data from the first measurement device G1 and the second measurement device G2 based on a predetermined communication protocol, divides the image data into files at predetermined time intervals, and stores the files in the measurement data storing unit 12. The image data also includes data indicating a photographing time and a camera ID.

The measurement interface 11 outputs the time-series image data captured by itself to the feature quantity extraction unit 13. In addition, the measurement interface 11 also has a function of transmitting a predetermined control command such as image quality adjustment and an activation instruction of the first measurement device G1 and the second measurement device G2 via the network N.

The measurement data storing unit 12 writes the image data described above in a memory area and outputs predetermined image data to the data visualization unit 24 according to a read instruction from the data visualization unit 24.

The feature quantity extraction unit 13 extracts a feature quantity of image data input to itself via the measurement interface 11 and specifies a position of the head and hands of a worker. More specifically, the feature quantity extraction unit 13 specifies the position of the head of the worker based on a photographed result (distant view) of the first measurement device G1. The feature quantity extraction unit 13 specifies the position of the hands of the worker based on a photographed result (near view) of the second measurement device G2. A known image analysis method is used for specifying the position of the head and hands of the worker by the feature quantity extraction unit 13. For example, there are a method of extracting an object of a specific color/specific size and a method of machine learning of a human skeleton.

In the first embodiment, the position of the head and hands of the worker is specified in a form of XY coordinates by using resolution of image data as a reference. For example, an output range of the position is set in such a way that the coordinates of the upper left corner on the screen are (X, Y)=(1, 1) and the coordinates of the lower right corner of the position output range are (X, Y)=(640, 480) for both distant view and the near view. Data of the position of the head and hands of the worker extracted by the feature quantity extraction unit 13 is output to the detailed step classification unit 16 and output to the working motion aggregation unit 21, as feature quantity data associated with the photographing time and the camera ID.

The first input unit 14 is, for example, a barcode reader, and is a reading device for inputting which worker performs what kind of work (referred to as a large step) in advance. The "large step" described above means a rough step of work performed at the work site.

For example, the worker brings the first input unit 14 close to the worker's own ID card so that the worker ID is read. Further, the worker brings the first input unit 14 close to a barcode attached to an assembly drawing of a product or the product itself so that the barcode is read. The data read in this manner includes a product lot, the barcode reading time, and the like, in addition to large step data including the worker ID and a type of "large step". Predetermined input using the first input unit 14 is performed at a frequency (for example, intervals of several minutes to several tens of minutes) which hardly affects work efficiency.

The large step setting unit 15 decodes large step data included in information from the second input unit 25.

The detailed step classification unit 16 subdivides the "large step" into more detailed "detailed steps" based on feature quantity data input from the feature quantity extraction unit 13 and large step data input from the large step setting unit 15. The plurality of "detailed steps" are set in advance in correlation with the "large step".

FIG. 2 is a functional block diagram of the detailed step classification unit 16 included in the work data management system W.

As illustrated in FIG. 2, the detailed step classification unit 16 includes an event determination unit 16a, an event determination list 16b, a step determination unit 16c, and a step determination list 16d.

The event determination unit 16a successively determines momentary "events" of work at the work site based on time-series feature quantity data input from the feature quantity extraction unit 13 and outputs the determination result to the step determination unit 16c. The "event" described above is a fine behavior having a level at which a step of work cannot be estimated with just this behavior, for example, the hands of the worker is reflected in a predetermined area on the screen and the worker is stopped in a predetermined area.

The event determination list 16b lists conditions of the feature quantity for determining the event and is set in advance.

FIG. 3 is an explanatory table of the event determination list 16b included in the detailed step classification unit 16.

The "#" illustrated in FIG. 3 is identification information attached to each event. The "head position α" represents a position of the head in the screen of the image data in the XY coordinates. For example, the "X:75 (±50)" means that the position of the head is within a range of ±50 pixels around the position of the 75th pixel on the right side using the upper left corner portion as a reference, in a case where image data is displayed on the screen.

The "hand position β" illustrated in FIG. 3 represents a position of the hand in the image data screen in the XY coordinates. The "logical expression" is a logical expression regarding a condition that the head position α is within a predetermined range and a condition that the hand position β is within a predetermined range. The "duration" is a time threshold for performing a predetermined determination of an event in a case where the logical expression described above is continuously established over time. The "determination content" is the content of an event that is determined (classified) based on a predetermined logical expression and duration.

For example, when referring to an event E1 illustrated in FIG. 3, the event determination unit 16a (see FIG. 2) performs the following processing. That is, in a case where a state in which the position α of the head of the worker exists in the predetermined area (X:75 (±50), Y:240 (±50)) and the position β of the hand is in the predetermined area (X:320 (±100), Y:200 (±50)) continues for more than 1 second, the event determination unit 16a determines that "a worker is staying in the vicinity of a processing machine". As such, the event determination unit 16a correlates a predetermined event with a momentary behavior (one frame of image data) of the worker. Then, the event determination unit 16a outputs event data which is the determination result to the step determination unit 16c illustrated in FIG. 2.

The step determination unit 16c determines (specifies) into which detailed step the motion of the worker is classified, based on large step data input from the large step setting unit 15 and event data input from the event determination unit 16a. As described above, the "detailed step" is a step obtained by subdividing the "large step" and is represented by a combination of a plurality of events.

The step determination list 16d is a list of conditions of large step data and event data for determining the detailed step and is set in advance.

FIG. 4 is an explanatory table of the step determination list 16d included in the detailed step classification unit 16.

The "#" illustrated in FIG. 4 is identification information attached to each detailed step. The "large step γ" is a type ("processing" in the first embodiment) of the large step and is input via the first input unit 14 (see FIG. 1).

The event δ illustrated in FIG. 4 indicates a predetermined condition regarding the combination of the events described above. The "logical expression" is a logical expression regarding the large step γ and the event δ. The "duration" is a time threshold for performing a predetermined determination of the detailed step in a case where the logical expression described above is continuously established over time. The "determination content" is the content of the detailed step determined (classified) based on a predetermined logical expression and duration time.

For example, when referring to the detailed step A1 illustrated in FIG. 4, the step determination unit 16c (see FIG. 2) performs the following processing. That is, in a case where the large step γ is "processing" and an event E2 occurs within 10 seconds after occurrence of the event E1, and a state in which both the type of the large step and the occurrence time limit of the event E2 are satisfied continues for more than 1 second, the step determination unit 16c determines that "A worker is setting a member in the processing machine". As such, the detailed step classification unit 16 (see FIG. 2) classifies the work performed by the worker at the work site into a plurality of time-series detailed steps based on work data including the image data of the work site. Further, the detailed step classification unit 16 specifies the detailed step performed by the worker based on a change in the position of the predetermined part (head and hand) on the body of the worker.

The detailed step data output from the step determination unit 16c (see FIG. 2) includes the start time and the end time of the detailed step in addition to data (detailed step A1 and the like) that specifies the detailed step. The contents of the event determination list 16b and the step determination list 16d can be appropriately changed by the user's operation via the second input unit 25 (see FIG. 1).

Again, description will be continued by referring back to FIG. 1.

The detailed step storing unit 17 successively writes detailed step data in the memory area and outputs the detailed step data to the data visualization unit 24 according to a read instruction from the data visualization unit 24.

The working time aggregation unit 18 calculates the working time for each detailed step based on detailed step data. The "working time" described above is the time taken for each detailed step. An example for the working time of the detailed step A1 is the time from the start time of the detailed step A1 to the start time of the next detailed step (for example, detailed step A2).

The working time storing unit 19 writes working time data from the working time aggregation unit 18 in the memory area and outputs the working time data to the data visualization unit 24 according to the read instruction from the data visualization unit 24.

The working time statistical analysis unit 20 calculates a predetermined statistical value regarding the working time of the detailed step (for example, detailed step A1) performed in the past predetermined period (for example, the past one week), and outputs the predetermined statistical value to the data visualization unit 24 as working time statistical data. The working time statistical data includes, for example, the minimum value, the first quartile, the median value, the third quartile, and the maximum value of the working time in the past week. The minimum value of the values and quartiles and the like are used when a box-and-whisker plot P2 (see FIG. 6A), to be described later, is created. A collection period of the working time and items of statistics can be appropriately changed by the operation of the user via the second input unit 25.

The working motion aggregation unit 21 generates working motion data based on feature quantity data input from the feature quantity extraction unit 13 and detailed step data input from the detailed step classification unit 16.

FIG. 5 is an explanatory table illustrating an example of working motion data generated by the working motion aggregation unit 21.

In the example illustrated in FIG. 5, the date and time at which photographing of the work site was performed, the detailed step, the elapsed time from the start of the detailed step, the position of the head of the worker, and the position of the hands of the worker are included in the working motion data.

The working motion storing unit 22 illustrated in FIG. 1 successively writes the working motion data described above in the memory area in correlation with the frame of the image data. The working motion storing unit 22 outputs the working motion data to the data visualization unit 24 according to the read instruction from the data visualization unit 24.

The working motion statistical analysis unit 23 calculates a statistical value regarding the work performed in the past predetermined period (for example, the past one week) and outputs the statistical value to the data visualization unit 24 as working motion statistical data. For example, in a case where a plurality of time-series detailed steps are repeated in a past predetermined period, the working motion statistical analysis unit 23 determines the existence probability of a predetermined part (head and hands of the worker) on the screen of the result display unit 26. More specifically, the working motion statistical analysis unit 23 calculates existence probability of the position of the head and hand in each detailed step for each elapsed time from the start of the work. The existence probability is used when existence probability distributions P9 and P11 (see FIG. 6A) described later are generated.

The working motion statistical analysis unit 23 also has a function of generating a flow line history of a predetermined part based on the momentary position of the predetermined part (head and hand) of the worker. The collection period and the statistical item of the working motion can be changed by the user's operation via the second input unit 25.

The data visualization unit 24 collects data stored in each storing unit based on the data input from the second input unit 25, and further arranges the data so that the user intuitively understands the data and generates visualization data. Details of visualization data will be described later.

The second input unit 25 is an input unit such as a mouse or a keyboard. In addition to various settings, the second input unit 25 is used when the user drags a reproduction time bar P5 (see FIG. 6A), which is to be described later.

The result display unit 26 is, for example, a liquid crystal display and has a function of displaying a screen image generated by the data visualization unit 24.

Example of Screen Image

Figure 6A:
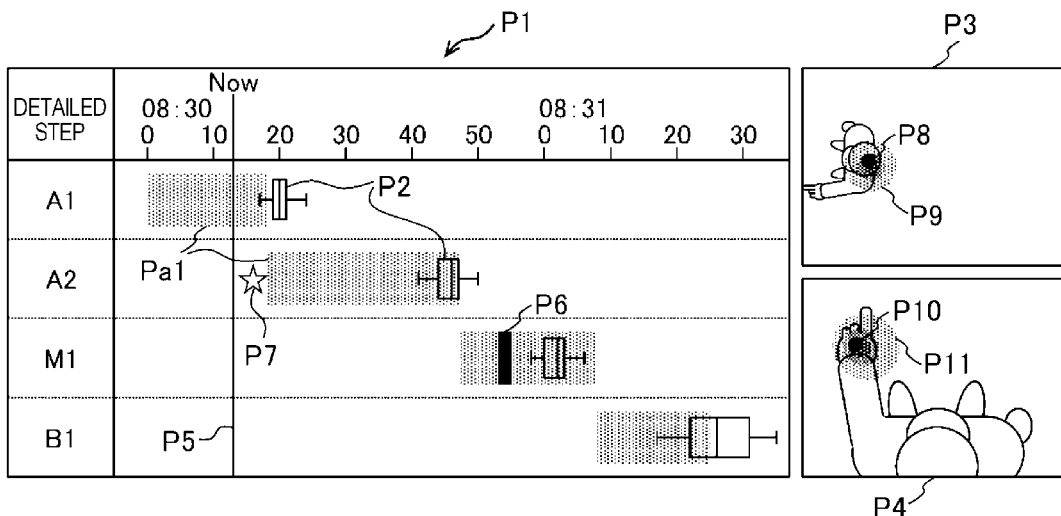
FIG. 6A is a screen image when a reproduction time bar is positioned in a detailed step A1, in the work data management system according to the first embodiment of the present invention.

FIG. 6A is a screen image when the reproduction time bar P5 is positioned in the detailed step A1 (see FIG. 1 as appropriate).

The screen image illustrated in FIG. 6A is configured to include a Gantt chart P1, a plurality of box-and-whisker plots P2 superimposed and displayed on the Gantt chart P1, and measurement data display areas P3 and P4.

The Gantt chart P1 visually indicates the time period during which the detailed steps A1, A2, M1, and B1 (see "determination contents" in FIG. 4) are performed. The horizontal axis of the Gantt chart P1 is time. The rows of the chart in the detailed steps A1, A2, M1, and B1 are sequentially arranged in the vertical direction. For example, in the row of the chart of the detailed step A1, an element Pa1 of the Gantt chart P1 regarding the detailed step A1 is displayed. As such, the data visualization unit 24 causes the result display unit 26 to display at least image data and a plurality of time-series detailed steps (Gantt chart P1 and the like). With this, the user (administrator) can grasp at a glance how much time the worker took for each of the detailed steps A1, A2, M1, and B1.

The box-and-whisker plot P2 is a statistical chart illustrating variation in time required for each detailed step and is created based on data obtained in the past predetermined period (for example, the past one week). For example, the minimum value, the first quartile, the median value, the third quartile, and the maximum value required for the detailed step A1 are calculated by the working time statistical analysis unit (see FIG. 1). Based on the statistical values, the box-and-whisker plot P2 of the detailed step A1 is created and superimposed and displayed on the Gantt chart P1. The same also similarly applies to the other detailed steps A2, M1, and B1.

As such, the data visualization unit 24 causes the result display unit 26 to display the detailed step and image data and causes the result display unit 26 to display working time statistical data (box-and-whisker plot P2 and the like). With this, the user (administrator) can grasp variation in the working time in each of the detailed steps A1, A2, M1, and B1 at a glance. For example, the detailed step B1 is indicated in the Gantt chart P1 in such a way that the width of the box-and-whisker plot P2 is relatively large and variation in the working time is large.

The reproduction time bar P5 (described as "Now" on the upper side) illustrated in FIG. 6A is a line indicating the reproduction time of images displayed on the measurement data display areas P3 and P4. When the images are being reproduced in the measurement data display areas P3 and P4, the reproduction time bar P5 moves to the right side of the screen. As such, when image data is displayed on the result display unit 26 as a moving image, the data visualization unit 24 causes a line (reproduction time bar P5) indicating the time at the time of reproduction of the image data to be superimposed and displayed on the Gantt chart P1. A work deviation marker P6 and a flow line variation abnormality marker P7 displayed on the Gantt chart P1 will be described later.

The measurement data display areas P3 and P4 are areas for displaying the image of the work site at a predetermined reproduction time, the existence probability distribution of the position of the head and the hand, and the like. In the example illustrated in FIG. 6A, the reproduction time bar P5 exists in the detailed step A1 in the Gantt chart P1. In the row of the chart of the detailed step A1, the work deviation marker P6 and the flow line variation abnormality marker P7 are not displayed and the width of the box-and-whisker plot P2 is narrow. As such, when the detailed step A1 is normally repeated, the data visualization unit 24 causes the measurement result (photographed result) of the first measurement device G1 to be displayed on the measurement data display area P3 and causes the measurement result (photographed result) of the second measurement device G2 to be displayed on the measurement data display area P4.

In the example illustrated in FIG. 6A, a recorded image obtained by photographing a worker from above by the first measurement device G1 for distant view photographing is reproduced as a moving image in the measurement data display area P3. A position marker P8 indicating the position of the head of the worker is displayed on the measurement data display area P3. Furthermore, an existence probability distribution P9 illustrating the existence probability of the position of the head at the reproduction time (elapsed time from the start of the detailed step A1) is superimposed and displayed on the photographed result of the first measurement device G1. As such, the data visualization unit 24 causes the existence probability distribution P9 which is a distribution of the existence probabilities of the predetermined part (for example, head) of the worker to be superimposed and displayed on the photographed result of the work site. The higher the area having the existence probability of the head position is, the more the existence probability distribution P9 is displayed with a dark shading. When the moving image is reproduced, the existence probability distribution P9 also changes momentarily.

In the example illustrated in FIG. 6A, a recorded image obtained by photographing a worker from above by the second measurement device G2 for near view photographing is reproduced as a moving image in the measurement data display area P4. A position marker P10 indicating the position of the hands of the worker is displayed on the measurement data display area P4. Furthermore, an existence probability distribution P11 illustrating existence probability of the position of the hand at the reproduction time is superimposed and displayed on the photographed result of the second measurement device G2.

At the reproduction time illustrated in FIG. 6A, work is normally performed as described above and thus, the head position marker P8 exists in the existence probability distribution P9 and the hand position marker P10 exists in the existence probability distribution P11. As such, the user (administrator) can visually grasp what kind of a motion the worker performed, while comparing the Gantt chart P1 and the box-and-whisker plot P2 with the existence probability distributions P9 and P11.

Figure 6B:
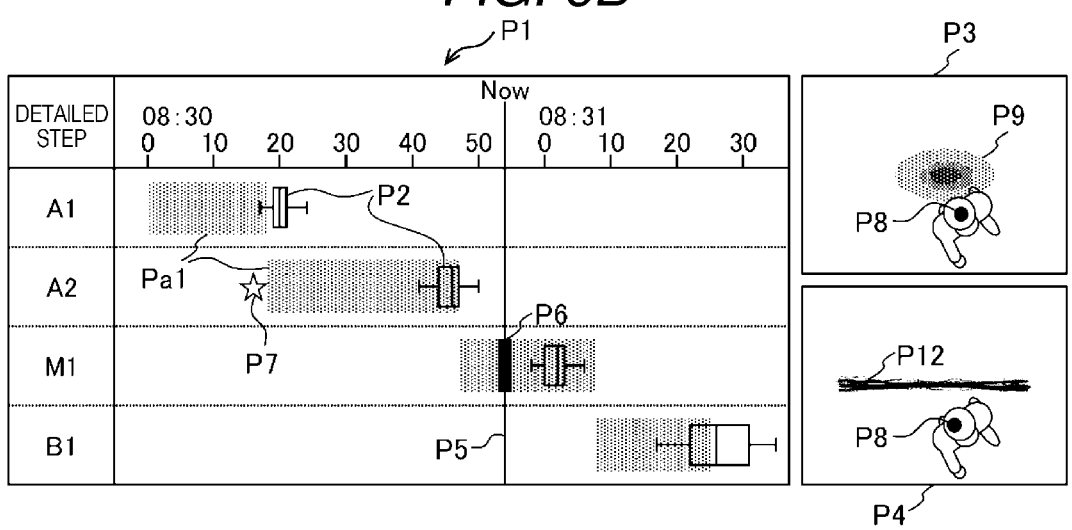
FIG. 6B is a screen image when the reproduction time bar is positioned in a detailed step M1, in the work data management system according to the first embodiment of the present invention.

FIG. 6B illustrates a screen image when the reproduction time bar P5 is positioned in the detailed step M1.

In the example illustrated in FIG. 6B, the work deviation marker P6 is displayed on the row of the chart of the detailed step M1. The work deviation marker P6 is a marker to be displayed on an element Pa1 of the Gantt chart P1 in a case where the motion of the worker deviates from the work repeated in the past. As such, in a predetermined detailed step, in a case where the position of a predetermined part (head or the hands of the worker) deviates from the existence probability distribution (existence probability is substantially zero), the data visualization unit 24 causes the work deviation marker P6 to be displayed on the element Pa1 of the Gantt chart P1 corresponding to the detailed step.

When work deviation occurs, the data visualization unit 24 causes images on a side deviated from the existence probability distribution in the measurement data display areas P3 and P4 among the images of the head and hands of the worker to be preferentially displayed. In the example illustrated in FIG. 6B, the position marker P8 of the head and the existence probability distribution P9 of the head are superimposed and displayed on the measurement data display area P3 together with the image of the distant view (photographed result of the work site). In the measurement data display area P4, the position marker P8 of the head and a flow line history P12 of the head are superimposed and displayed together with the image of the distant view. The flow line history P12 is a flow line history of the position of the head in the detailed step M1. As such, the user can efficiently confirm information on the work deviation by displaying the flow line history P12 in addition to the Gantt chart P1 and the like.

Figure 6C:
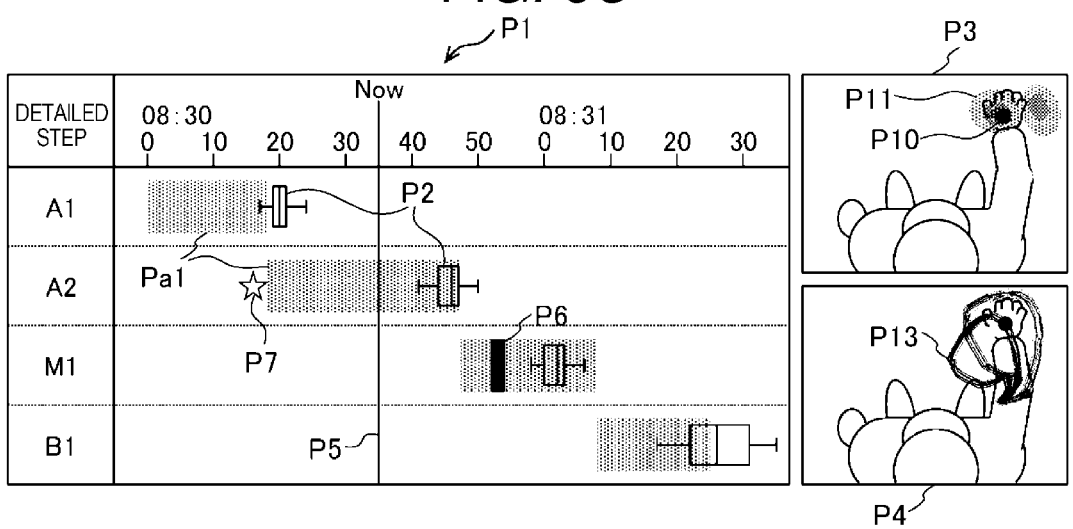
FIG. 6C is a screen image when the reproduction time bar is positioned in a detailed step A2, in the work data management system according to the first embodiment of the present invention.

FIG. 6C illustrates a screen image when the reproduction time bar P5 is positioned in the detailed step A2.

In the example illustrated in FIG. 6C, the flow line variation abnormality marker P7 is displayed on the row of the chart of the detailed step A2. The flow line variation abnormality marker P7 is a marker displayed in correlation with the element Pa1 of the Gantt chart P1 in a case where the motion of the work (that is, flow line history) is repeated in the past varies significantly. Whether to display the flow line variation abnormality marker P7 or not is determined based on a variance value of the flow line history P12.

As such, in a case where the variance value of a plurality of flow line histories is greater than or equal to a predetermined threshold value in a predetermined detailed step, the data visualization unit 24 causes the flow line variation abnormality marker P7 to be displayed on the element Pa1 of the Gantt chart P1 corresponding to the detailed step.

In a case where the flow line variation abnormality occurs, the data visualization unit 24 causes the image on the side where the variance value of the flow line history exceeds the predetermined threshold value among the images of the head and hands of the worker to be preferentially displayed on the measurement data display areas P3 and P4. In the example illustrated in FIG. 6C, the variance value of the flow line history of the hand exceeds the predetermined threshold value and thus, the position marker P10 of the hand and the existence probability distribution P11 of the hand are superimposed and displayed on the measurement data display area P3, together with the image of the near view. In the measurement data display area P4, the position marker P10 of the hand and a flow line history P13 of the hand are superimposed and displayed together with the image of near view. The user can efficiently confirm information on the flow line variation abnormality by displaying the flow line history P13 in addition to the Gantt chart P1 or the like.

Processing of Information Processing Device

Figure 7:
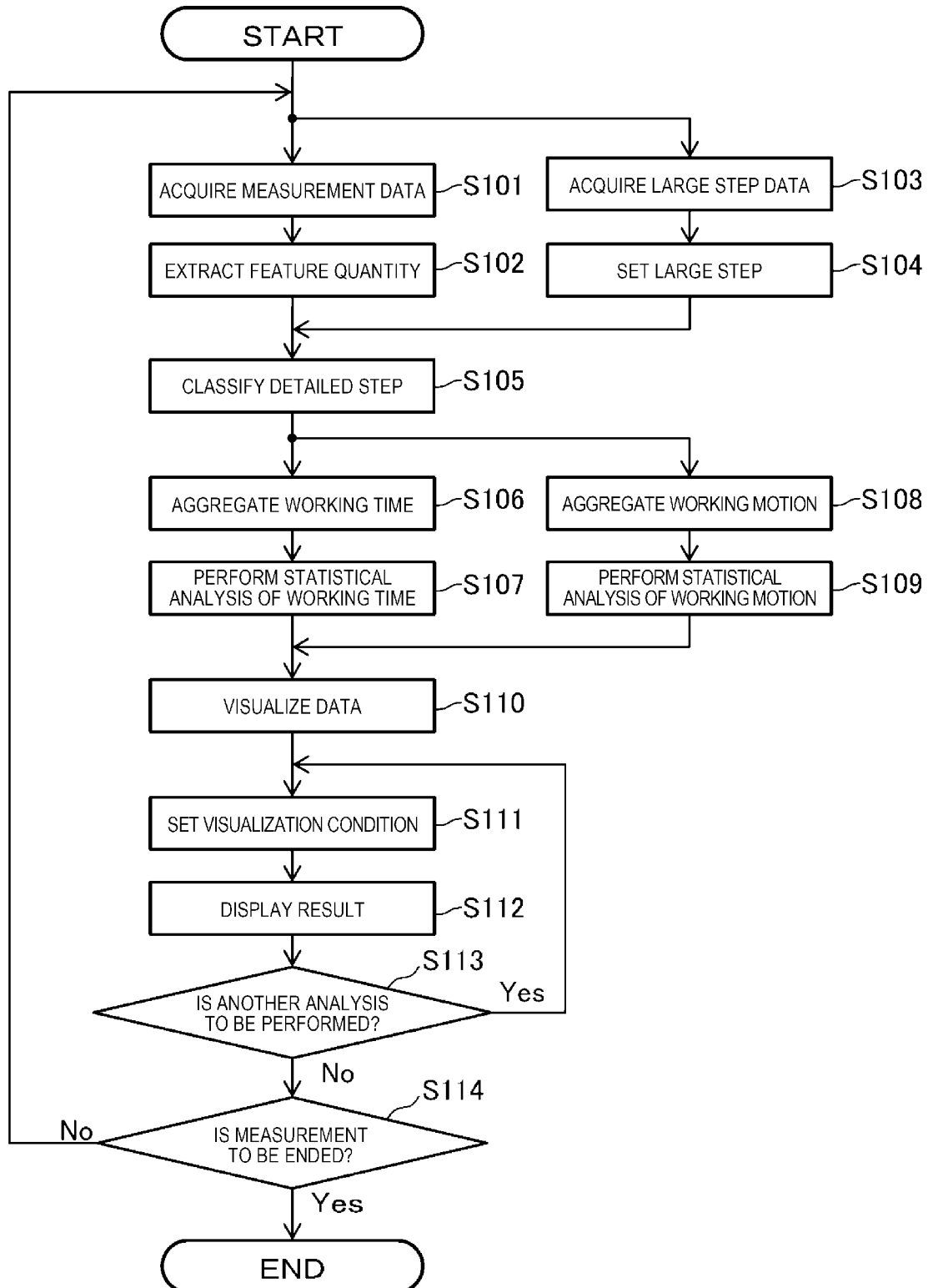
FIG. 7 is a flowchart illustrating processing of an information processing device included in the work data management system according to the first embodiment of the present invention.

FIG. 7 is a flowchart illustrating processing of the information processing device 100 (see FIG. 1 as appropriate).

In step S101, the information processing device 100 acquires measurement data. That is, the information processing device 100 acquires measurement data (image data) from the first measurement device G1 and the second measurement device G2 via the network N by the measurement interface 11.

In step S102, the information processing device 100 extracts a feature quantity. That is, the information processing device 100 extracts the position of the head and hands of the worker by the feature quantity extraction unit 13. Processing in steps S101 and S102 is performed for momentary image data (that is, for each frame). In parallel with steps S101 and S102, processing in steps S103 and S104 to be described later is performed, for example, every several minutes.

In step S103, the information processing device 100 acquires large step data. That is, the information processing device 100 acquires large step data via the first input unit 14.

In step S104, the information processing device 100 performs setting of a large step. That is, the information processing device 100 decodes large step data acquired via the first input unit 14 by the large step setting unit 15.

In step S105, the information processing device 100 performs classification of the detailed steps (detailed step classification processing). That is, the information processing device 100 classifies momentary motions of the worker into predetermined detailed steps by the detailed step classification unit 16, based on the feature quantity extracted in step S102 and the large step which is set in step S104. Although not illustrated in FIG. 7, processing insteps S101 to S105 is repeated for image data or the like for the past predetermined period (for example, for the past week).

Next, in step S106, the information processing device 100 aggregates the working time. That is, in the information processing device 100, the working time aggregation unit 18 aggregates the working time required for each detailed step and generates working time data.

In step S107, the information processing device 100 performs statistical analysis of the working time. That is, regarding each detailed step, the information processing device 100 generates the working time statistical data used for creating the box-and-whisker plot P2 (see FIG. 6A) described above by the working time statistical analysis unit 20. In parallel with steps S106 and S107, processing in steps S108 and S109 to be described later is performed.

In step S108, the information processing device 100 aggregates the working motions. That is, in the information processing device 100, the working motion aggregation unit 21 generates working motion data (see FIG. 5) of each detailed step. In step S109, the information processing device 100 performs statistical analysis of the working motion. That is, in the information processing device 100, the working motion statistical analysis unit 23 generates working motion statistical data used for creating the existence probability distributions P9 and P11, the flow line histories P12 and P13 (see FIGS. 6A, 6B, and 6C), and the like.

In step S110, the information processing device 100 performs visualization of data. That is, in step S110, the information processing device 100 generates predetermined visualization data by the data visualization unit 24 based on measurement data, feature quantity data, large step data, detailed step data, working time statistical data, and working motion statistical data described above.

In step S111, the information processing device 100 performs setting of a visualization condition. That is, the information processing device 100 sets a visualization condition for causing the result display unit 26 to display a predetermined image according to an operation via the second input unit 25. For example, among various data such as the Gantt chart P1 (see FIG. 6A), the box-and-whisker plot P2, and the existence probability distributions P9 and P11, data to be actually displayed on the result display unit 26 is set by the operation via the second input unit 25.

In step S112, the information processing device 100 performs display of a result (data visualization processing). That is, in the information processing device 100, the data visualization unit 24 causes the result display unit 26 to display the image illustrated in FIG. 6A or the like.

In step S113, the information processing device 100 determines whether another analysis is to be performed or not. For example, as another analysis, setting change such as changing a calculation method of the variance value in the motion history may be included. In a case where the other analysis is performed in step S113 (Yes in S113), processing of the information processing device 100 returns to step S111. In this case, setting of the visualization condition is executed again (S111), and a predetermined result is displayed based on the condition (S112).

On the other hand, in a case where the other analysis is not performed in step S113 (No in S113), processing of the information processing device 100 proceeds to step S114. In step S114, the information processing device 100 determines whether measurement is to be ended or not. That is, the information processing device 100 determines, according to the operation via the second input unit 25, whether measurement of the working motion is to be ended or not. In a case where measurement of the working motion is not to be ended (No in S114), processing of the information processing device 100 returns to steps S101 and S103. On the other hand, in a case where measurement of the working motion is to be ended (Yes in S114), the information processing device 100 ends the series of processing (END).

Effect

According to the first embodiment, the large step to be performed by the worker is subdivided into the plurality of time-series detailed steps based on the image data of the work site and the like and the plurality of time-series detailed steps are displayed as the Gantt chart P1 on the result display unit 26 (see FIG. 6A). With this, the user (administrator) can easily grasp how long it takes in each detailed step. In addition, it is unnecessary for the worker to wear a position sensor (not illustrated) or an acceleration sensor (not illustrated), thereby saving time and effort on the worker side.

Also, based on statistical information of the work repeated by the worker in the past, the flow line histories P12 and P13 (see FIG. 6B and FIG. 6C) are appropriately displayed, in addition to the box-and-whisker plot P2 (see FIG. 6A) and the existence probability distributions P9 and P11. With this, the user can easily grasp a positional relationship between the existence probability distribution P9 and the head of the worker and a positional relationship between the existence probability distribution P11 and the hands of the worker. As such, the working time and a tendency of the motion of the worker in each detailed step are grasped so as to make it possible to improve product quality and productivity.

In a case where there is a deviation of the work by the worker, the data visualization unit 24 causes the work deviation marker P6 to be displayed on the element Pa1 of the Gantt chart P1 (see FIG. 6A and the like). In a case where the variance value of the flow line history is greater than or equal to the predetermined threshold value, the data visualization unit 24 causes the flow line variation abnormality marker P7 to be displayed on the element Pa1 of the Gantt chart P1 (see FIG. 6A and the like). With this, the user can easily grasp that some kind of abnormality has occurred in the work and reflect matters of the abnormality in a subsequent policy.

Second Embodiment

A second embodiment differs from the first embodiment in that data analysis and visualization are performed in real time. Also, the second embodiment differs from the first embodiment in that for example, in a case where a delay in work occurs, a data visualization unit 24A (see FIG. 8) causes the result display unit 26 (see FIG. 8) to display data on the policy. Others are the same as in the first embodiment. Accordingly, portions different from those of the first embodiment will be described, and description of redundant portions will be omitted.

Figure 8:
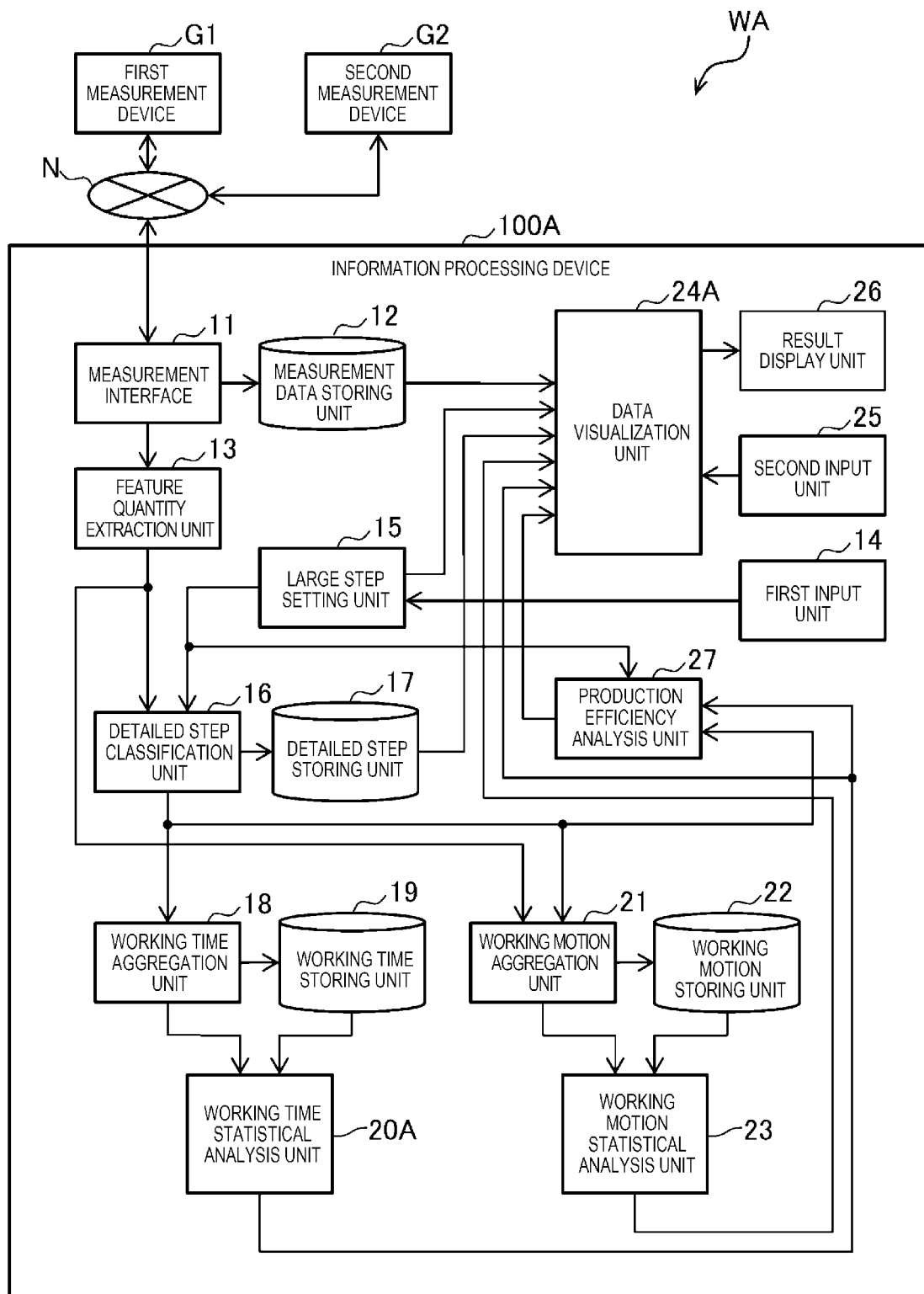
FIG. 8 is a functional block diagram illustrating a configuration of a work data management system according to a second embodiment of the present invention.

FIG. 8 is a functional block diagram illustrating a configuration of a work data management system WA according to the second embodiment.

An information processing device 100A illustrated in FIG. 8 has a configuration in which a production efficiency analysis unit 27 is added to the configuration (see FIG. 1) of the first embodiment and further additional functions are added to a working time statistical analysis unit 20A and the data visualization unit 24A.

In addition to outputting the working time statistical data described in the first embodiment, the working time statistical analysis unit 20A calculates the average working time for each detailed step. That is, the working time statistical analysis unit 20A calculates the average working time for each of the detailed steps A1, A2, M1, and B1 (see FIG. 4).

In addition to various data described in the first embodiment, the data visualization unit 24A causes the result display unit 26 to display the policies presented by the production efficiency analysis unit 27 to be described later.

The production efficiency analysis unit 27 estimates a progress of work based on various data and presents a predetermined policy for improving productivity according to the state of progress.

FIG. 9 is a functional block diagram of the production efficiency analysis unit 27 included in the information processing device 100A.

As illustrated in FIG. 9, the production efficiency analysis unit 27 includes a step completion prediction unit 27a, a large step production plan 27b, a step progress analysis unit 27c, a policy list 27d, and a policy selection unit 27e.

The step completion prediction unit 27a predicts the completion time of a large step based on large step completion data input from the large step setting unit 15, detailed step data input from the detailed step classification unit 16, and working time statistical data input from the working time statistical analysis unit 20A. As an example of prediction of the completion time of the large step, in a case where start information of a "processing" step is given from large step data, the step completion prediction unit 27a stores the time T1 thereof. The step completion prediction unit 27a estimates a time ΔT2 required for the processing step by summing up the average working time of each detailed step included in working time statistical data.

Then, the step completion prediction unit 27a calculates the prediction completion time of the processing step by adding the time ΔT2 to the time T1 described above. When the first detailed step A1 included in the processing step is completed, the step completion prediction unit 27a sets the completion time as a new time T1. Then, the step completion prediction unit 27a sets a new time ΔT2 by subtracting the average working time of the detailed step A1 from the time ΔT2.

Furthermore, the step completion prediction unit 27a adds the time ΔT2 to the new time T1 to update the prediction completion time of the processing step. As such, the prediction completion time of the processing step is successively updated every time the detailed step is completed. In other words, in a case where image data of the work site is displayed on the result display unit 26 in real time, the working time statistical analysis unit 20A calculates the prediction completion time of the large step including the plurality of time-series detailed steps, based on the average value of the working time and the current time.

As the time ΔT2 described above, a median value of the working time may be used, or a predetermined index considering the variance value of the working time may be used. With this, the time ΔT2 can be obtained with higher accuracy.

The large step production plan 27b illustrated in FIG. 9 is a list in which the plan start time and plan completion time of the large step are described for each large step, and is set in advance. The large step production plan 27b may be updated by a user's operation via the second input unit 25 (see FIG. 8).

The step progress analysis unit 27c analyzes the progress situation for the large step production plan based on the prediction completion time of the large step and the large step production plan 27b described above. For example, in a case where the plan completion time of processing step stored in the large step production plan 27b is 8:31':15" and the prediction completion time is 8:31':25", the step progress analysis unit 27c outputs delay data such as "+10 seconds".

The policy list 27d is a list in which predetermined policies for improving productivity are described, and is set in advance in correlation with a level of process delay. That is, the policy list 27d is "storing unit" in which the time difference between the plan completion time and the prediction completion time of the large step and the predetermined policy information regarding work are stored in correlation with each other in advance.

FIG. 10 is an explanatory table of the policy list 27d of the production efficiency analysis unit 27.

The "level" illustrated in FIG. 10 is identification information correlated with predetermined delay data and a policy. The "delay data" is data indicating the degree to which work is later (or too early) than planned. The "policy" is a countermeasure for improving production efficiency, and is correlated with delay data.

The policy selection unit 27e illustrated in FIG. 9 selects an appropriate policy from among the policy list 27d based on delay data input from the step progress analysis unit 27c. That is, the policy selection unit 27e selects policy information corresponding to the time difference based on the time difference between the plan completion time and the prediction completion time of the large step. For example, in a case where the delay data is greater than or equal to +1 minute and less than or equal to +3 minutes, the policy selection unit 27e selects a policy for the worker such as "work with slightly increased pitch". In this case, the worker may be informed in real time via the network N (see FIG. 8) so that the worker may work with a slightly increased pitch.

Figure 11:
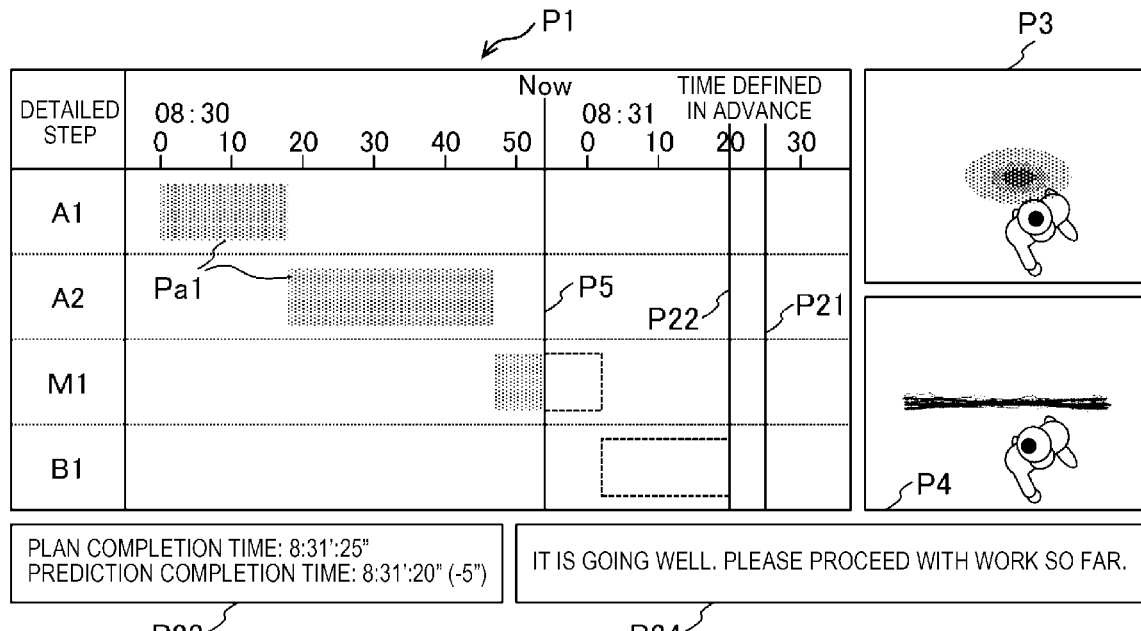
FIG. 11 is a screen image generated by a data visualization unit of the work data management system according to the second embodiment of the present invention.

FIG. 11 illustrates a screen image generated by the data visualization unit 24A of the work data management system WA. Illustration of the work deviation marker P6 (see FIG. 6A) and the flow line variation abnormality marker P7 (see FIG. 6A) illustrated in the first embodiment is omitted.

In the example illustrated in FIG. 11, in addition to the Gantt chart P1 and the reproduction time bar P5, a line P21 of the plan completion time based on the large step production plan 27b (see FIG. 9) and a line P22 of the prediction completion time based on delay data are displayed. As such, the data visualization unit 24A causes the line P5 indicating the current time to be superimposed and displayed on the Gantt chart P1 and causes the line P21 indicating the plan completion time of the large step and the line P22 indicating the prediction completion time which are set in advance to be superimposed and displayed on the Gantt chart P1.

As illustrated in FIG. 11, a display area P23 for the plan completion time and prediction completion time and a message area P24 for displaying policy information are provided. Then, the data visualization unit 24A causes policy information selected by the policy selection unit 27e (see FIG. 9) to be displayed on the message area P24 of the result display unit 26.

Effect

According to the second embodiment, the line P21 indicating the plan completion time and the line P22 indicating the prediction completion time of the large step are superimposed and displayed on the Gantt chart P1 (see FIG. 11) created in real time. With this, the user (administrator) can easily grasp the progress situation of work by comparing the plan completion time and the prediction completion time. Further, predetermined policy information is displayed on the message area P24, based on the delay data. With reference to the policy information, the user can make a future policy to improve production efficiency and the like.

Third Embodiment

The third embodiment differs from the first embodiment in that an information processing device 100Ba (see FIG. 12) performs analysis on a predetermined work site and an information processing device 100Bb (see FIG. 12) performs analysis on another work site. Also, the third embodiment differs from the first embodiment in that a data integration apparatus 200 (see FIG. 12) integrates analysis results of the information processing devices 100Ba and 100Bb. Others are the same as in the first embodiment. Accordingly, portions different from those of the first embodiment will be described, and description of redundant portions will be omitted.

Figure 12:
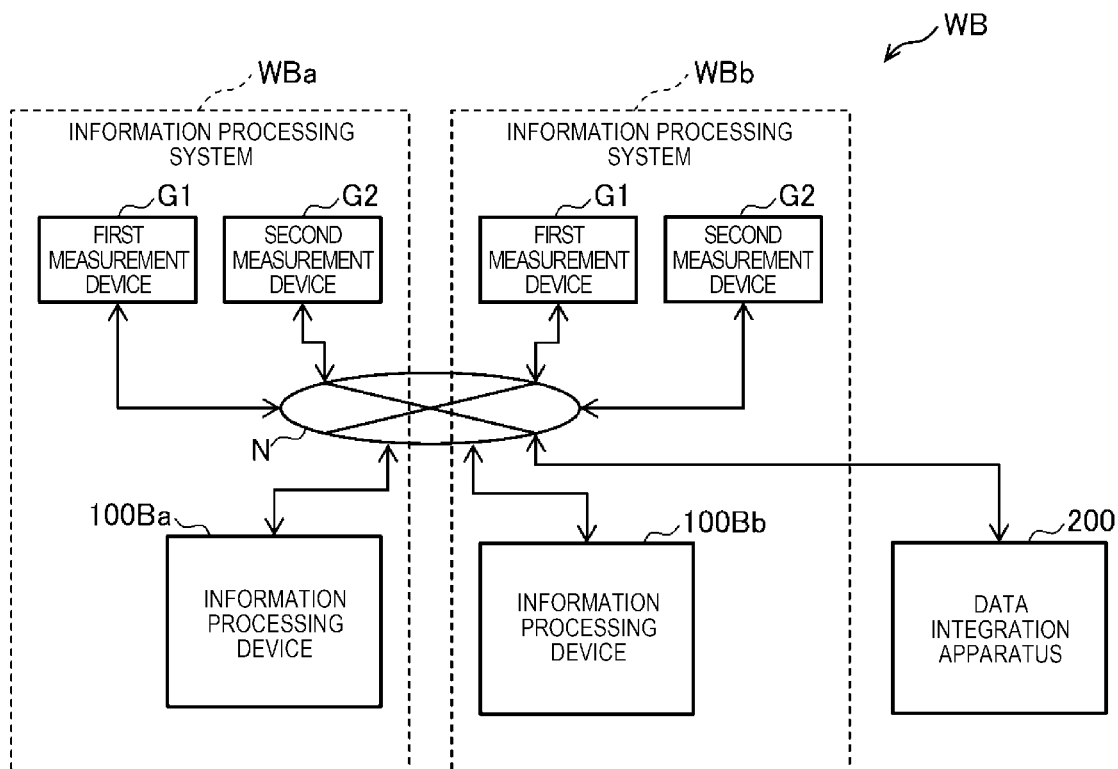
FIG. 12 is a functional block diagram illustrating a configuration of a work data management system according to a third embodiment of the present invention.

FIG. 12 is a functional block diagram illustrating a configuration of a work data management system WB according to the third embodiment.

As illustrated in FIG. 12, the work data management system WB includes two systems of information processing systems WBa and WBb and a data integration apparatus 200.

The information processing system WBa is a system that analyzes work of a worker at a predetermined work site. As illustrated in FIG. 12, the information processing system WBa includes the first measurement device G1, the second measurement device G2, and the information processing device 100Ba.

The other information processing system WBb is a system that analyzes work of a worker at another work site. The information processing system WBb includes the first measurement device G1, the second measurement device G2, and the information processing device 100Bb.

For example, the information processing device 100Ba analyzes work that a single worker repeats processing of a product and the information processing device 100Bb analyzes work that another worker repeats assembly of the product after the processing. That is, in a case where the plurality of types of work are sequentially performed such that a predetermined product is manufactured, the plurality of types of work are handled by different workers, respectively, as the large step including the plurality of time-series detailed steps. In the third embodiment, the information processing devices 100Ba and 100Bb individually analyze motions of a plurality of workers who perform such work flow (processing and assembly) and the analysis results are integrated by the data integration apparatus 200.

The work site as the measurement target (photographing target) of the first measurement device G1 and the second measurement device G2 and the work site as the measurement target (photographing target) of the first measurement device G1 and the second measurement device G2 are not far apart from each other.

Figure 13:
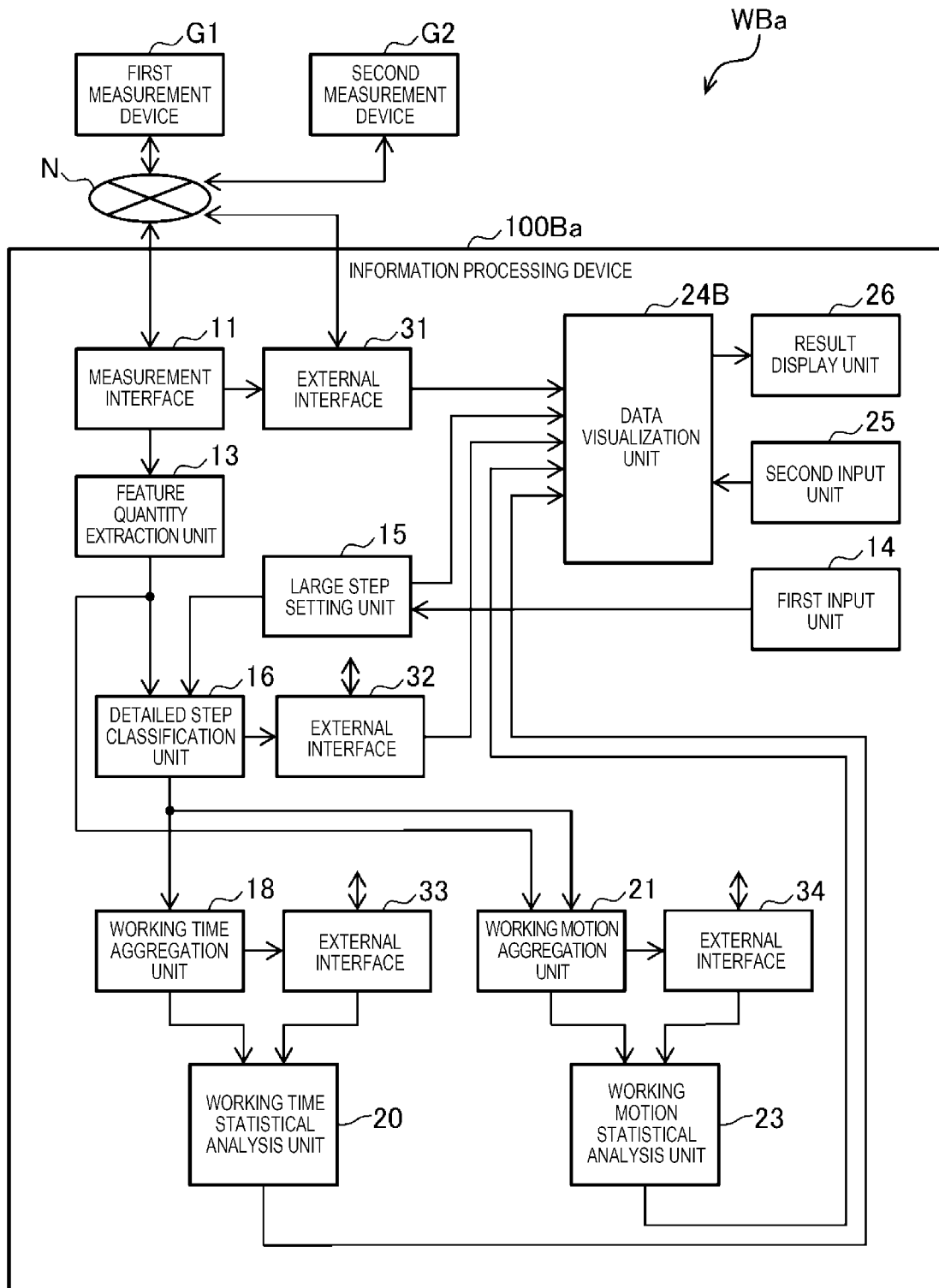
FIG. 13 is a functional block diagram of an information processing system included in the work data management system according to the third embodiment of the present invention.

FIG. 13 is a functional block diagram of the information processing system WBa included in the work data management system WB.

The information processing device 100Ba illustrated in FIG. 13 has a configuration in which storing units of the information processing device 100 (see FIG. 1) described in the first embodiment are respectively replaced with external interfaces 31 to 34. This is for collecting various data in the data integration apparatus 200 (see FIG. 12) via the network N. Each of the external interfaces 31 to 34 executes similar processing. The arrows on the upper side of the rectangular frame of the external interfaces 31 to 34 indicate that the external interfaces 31 to 34 are connected to the network N.

The external interface 31 successively transmits measurement data to the data integration apparatus 200 (see FIG. 12) via the network N based on a predetermined communication protocol. Feature quantity data, large step data, detailed step data, working time statistical data, working motion statistical data, and the like are successively transmitted to the data integration apparatus 200 (see FIG. 12) via the other external interfaces 32 to 34. The external interfaces 31 to 34 also have a function of collecting predetermined data from the data integration apparatus 200 in response to an instruction from the data visualization unit 24B. The information processing device 100Bb illustrated in FIG. 12 also has the same configuration as that of the information processing device 100Ba described above.

Figures 14, 15:
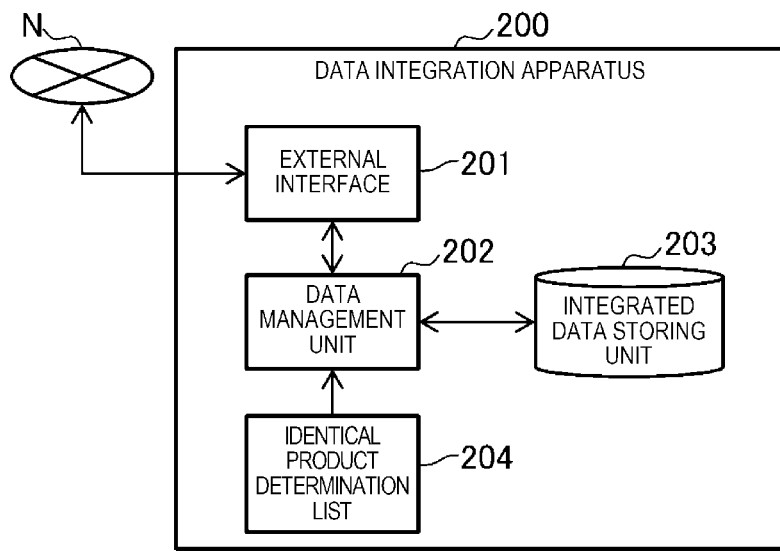
FIG. 14 is a functional block diagram of a data integration apparatus included in the work data management system according to a third embodiment of the present invention.
FIG. 15 is an explanatory table of an identical product determination list of the data integration apparatus included in the work data management system according to the third embodiment of the present invention.

FIG. 14 is a functional block diagram of the data integration apparatus 200 included in the work data management system WB.

As illustrated in FIG. 14, the data integration apparatus 200 includes an external interface 201, a data management unit 202, an integrated data storing unit 203, and an identical product determination list 204.

The external interface 201 collects various data described above from the information processing devices 100Ba and 100Bb (see FIG. 12) based on a predetermined communication protocol. The external interface 201 transmits predetermined data to the information processing device 100Ba according to a request from the information processing device 100Ba and transmits predetermined data to the information processing device 100Bb according to a request from the information processing device 100Bb.

The data management unit 202 integrates various data received from the information processing devices 100Ba and 100Bb and stores the integrated data in the integrated data storing unit 203. In response to a request via the external interface 201, the data management unit 202 reads integrated data recorded in the integrated data storing unit 203 and converts the integrated data into predetermined data. Then, the data management unit 202 outputs converted data to the external interface 201.

In the third embodiment, as described above, the information processing device 100Ba (see FIG. 12) analyzes work of processing by the worker. The information processing device 100Bb (see FIG. 12) analyzes work of assembly by another worker on the downstream side. Then, the data integration apparatus 200 (see FIG. 12) uses the "time" at which the predetermined work is performed and the "position" of the head and the hands of the worker as keys, and associates analysis results of the information processing devices 100Ba and 100Bb with each other, and integrates the analysis results as work data on the identical product. In this case, the identical product determination list 204 illustrated in FIG. 15 is used.

FIG. 15 is an explanatory table of the identical product determination list 204 provided in the data integration apparatus 200.

The "large step" illustrated in FIG. 15 includes a large step (processing) which is set via the first input unit 14 of the information processing device 100Ba and another large step (assembly) which is set via the first input unit 14 of the other information processing device 100Bb.

The "item" illustrated in FIG. 15 is an item indicating the start and completion of processing and assembly. The "position of head" is a position of the head of the worker at the time of the start and completion of processing and assembly. The "position of hand" is a position of the hands of the worker at the time of the start and completion of processing and assembly. The "average elapsed time" is a value obtained by averaging the elapsed time from the time of start of processing based on data of processing and assembly repeated in the past. The "large step", "item", "position of head", "position of hand", and "average elapsed time" are correlated with each other as illustrated in FIG. 15 and are stored in advance as the identical product determination list 204.

The data management unit 202 illustrated in FIG. 14 determines, based on the identical product determination list 204, that images photographed at the completion timing of the processing step and images photographed at the start timing of the assembly step at the "predetermined time" elapsed from the completion timing are related to the identical product. In the example illustrated in FIG. 15, the data management unit 202 sets a period of 10 seconds 20 which is a value obtained by subtracting 1 minute 25 seconds 05, which is the average elapsed time at the time of completion of processing, from 1 minute 35 seconds 25, which is the average elapsed time at the time of the start of assembly to the predetermined time described above.

With this, a unique production number corresponding to a product to be worked can be given to predetermined work data. As such, the data management unit 202 associates corresponding work data with a plurality of types of work (processing/assembly) based on the time at the start and completion of the work and the position of the predetermined part (head and hands of the worker), and further gives predetermined identification information thereto. In a case where a barcode for identification is not attached to the product to be worked, association of the data described above is particularly effective.

Predetermined work data integrated by the data integration apparatus 200 is transmitted to the information processing devices 100Ba and 100Bb via the network N. Then, a Gantt chart P1 or the like (see FIG. 16) described later is displayed on each result display unit 26 (see FIG. 13).

Figure 16:
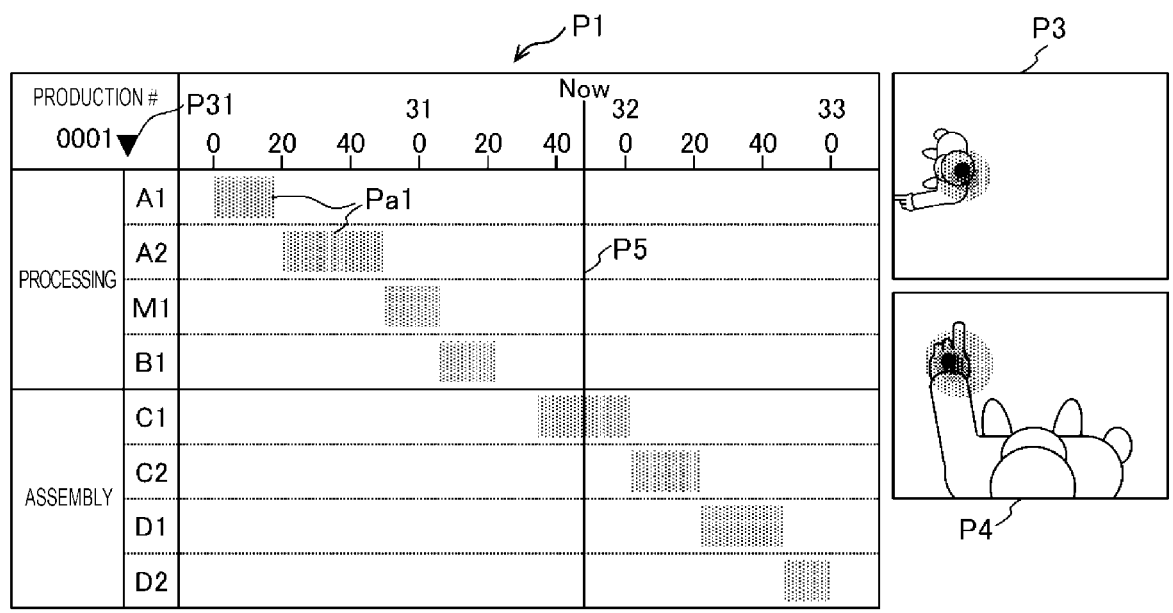
FIG. 16 is a screen image generated by the data visualization unit of the work data management system according to the third embodiment of the present invention.

FIG. 16 illustrates a screen image generated by the data visualization unit 24B.

Illustration of the work deviation marker P6 (see FIG. 6A) and the flow line variation abnormality marker P7 (see FIG. 6A) illustrated in the first embodiment is omitted.

When a production number selection button P31 is selected by the user's operation via the second input unit 25 (see FIG. 13), a list of the products that were worked in the past (that is, a list of production numbers) is displayed. In the example illustrated in FIG. 16, the Gantt chart P1 or the like relating to processing/assembly of the product having a production number of 0001 is displayed.

Then, the Gantt chart P1 or the like obtained by integrating a plurality of types of work (processing/assembly) for a product selected by the production number selection button P31 is displayed. As such, the data visualization unit 24B causes the result display unit 26 (see FIG. 13) to display a plurality of time-series detailed steps constituting each work (processing/assembly) as the Gantt chart P1.

Effect

According to the third embodiment, the data integration apparatus 200 associates the analysis results of the information processing devices 100Ba and 100Bb by using the "time" and the "position" of the head and hands of the worker as keys and integrates work data on the identical product. With this, even in a case where a plurality of workers are working at different sites, it is possible to display the Gantt chart P1, in which respective works are integrated, or the like on the result display unit 26 (see FIG. 13). Accordingly, it becomes possible for a user (administrator) to efficiently grasp steps having a lot of work delay and work error and occurrence tendencies of the steps, and productivity of the product can be enhanced.

Modification Example

Although the work data management system W and the like according to the present invention have been described by using the respective embodiments as above, the present invention is not limited to descriptions of the embodiments, and various modifications can be made thereto.

For example, in the first embodiment, the configuration in which the work data management system W (see FIG. 1) includes the first measurement device G1 and the second measurement device G2 has been described, but the present invention is not limited thereto. That is, the number of the measurement devices may be one or three or more. This also similarly applies to the second embodiment and the third embodiment.

In each of the embodiments, the example in which the work data management system W extracts the position of the head and hands of the worker as the feature quantity is described, but the present invention is not limited thereto. For example, the position of a device or a tool (not illustrated) may be added. With this, it is possible to further improve determination accuracy of the detailed step.

In each of the embodiments, a case where the first measurement device G1 and the second measurement device G2 are network cameras has been described. However, the present invention is not limited to thereto and a universal serial bus (USB) camera or the like may be used. Further, as the first measurement device G1 and the second measurement device G2, a sensor mounted on a processing device, an external acceleration sensor, and the like, in addition to the camera, may be combined.

In each embodiment, visualized contents in the detailed step are represented using the Gantt chart P1 (see FIG. 6A), but the present invention is not limited thereto. For example, data relating to the detailed step may be listed, or another method capable of grasping the progress status of the detailed step may be used.

In the first embodiment, the example in which the statistical value of the working time is visualized as the box-and-whisker plot P2 (see FIG. 6A) has been described, but the present invention is not limited thereto. As long as a method by which statistical information on past work performed by the user can be efficiently grasped, statistical value of the working time may be visualized in another form.

In the first embodiment, the example in which the reproduction time bar P5 (see FIG. 6A) moves to the right with progress of video reproduction has been described, but the present invention is not limited thereto. For example, the entire Gantt chart P1 may be moved to the left side and accordingly, the reproduction time bar P5 is displayed at a position at which where the reproduction time bar P5 is always easy to see.

In each of the embodiments, the example in which contents of the measurement data display areas P3 and P4 (see FIG. 6A) are images has been described, but the present invention is not limited thereto. As long as the user can efficiently grasp the situation of the detailed step, a graph display of the measurement value of the sensor data or the like may be available.

In the first embodiment, the example in which the working time statistical analysis unit 20 (see FIG. 1) calculates the median value of the working time required for the detailed step and the like has been described, but the present invention is not limited thereto. That is, the working time statistical analysis unit 20 may generate working time statistical data including the median value and/or the average value of the working time required for the detailed step for each of the detailed steps in the past predetermined period. This also similarly applies to the second embodiment and the third embodiment.

In the third embodiment, the configuration in which the work data management system WB (see FIG. 12) includes two systems of information processing systems Wba and WBb has been described, but the configuration in which the work data management system WB includes three or more information processing systems may be available.

Further, the embodiments may be appropriately combined. For example, the second embodiment and the third embodiment may be combined to analyze work of each worker in real time using the information processing devices 100Ba and 100Bb and the analysis results may be integrated by the data integration apparatus 200. With this, it is possible to visualize the step progress status and policy for each worker in real time.

In each of the embodiments, the example in which an analysis target of the work data management system W or the like is a manufacturing site (work site) of the product has been described, but the present invention is not limited thereto. That is, as long as it is a case where the worker repeats predetermined work, the present invention can be applied to other work sites.

In addition, each embodiment has been described in detail in order to explain the present invention in an easy-to-understand manner, and is not necessarily limited to those having all configurations described above. It is possible to add, delete, or replace another configuration for a portion of the configuration of each embodiment. In addition, the mechanisms and configurations described above indicate what is considered necessary for explanation, and does not necessarily indicate all mechanisms and configurations of a product.

What is claimed is:

1. A work data management system, comprising:
a first camera configured to capture first image data of a movement of a worker in a work site;
a second camera configured to capture second image data of movement of the worker in the work site;
barcode reader configured to read information from a barcode attached to an object in a work site;
a processor connected to the barcode reader, first camera and the second camera, programmed to:
extract first feature quantity data from the first image data and determines positions of a head of the worker in a first period of time using coordinates based on the first image data;
extract second feature quantity data from the second image data and determines positions of a hand of the worker in a second period of time using coordinates based on the second image data;
determine that the worker is performing two or more first work events performed by the worker in the work site based on the determined coordinate positions of the head and the hand of the worker within a predetermined period of time,
determine a type of work performed by the worker in the work site based on the read information from the barcode reader,
determine, based on predefined combinations of the type of work performed by the worker and two or more first work events occurring within a predetermined amount of time, that the worker is performing one of a plurality of predefined second work events in the work site,
generate time-series of visualization data based on the determined predefined second work events that the worker is performing, the first feature quantities and the second feature quantities, the determined coordinate positions of the head, the determined coordinate positions of the hand, and
display the generated time-series visualization data on a display including visual representations of respective positions of the head and the hand of the worker.

2. The work data management system according to claim 1,
wherein the processor is programmed to display the second work events by using a Gantt chart.

3. The work data management system according to claim 2,
wherein the processor is programmed to superimpose and display a line indicating the time at the time of reproduction of the image data on the Gantt chart when causing the display unit to display the image data as a moving image.

4. The work data management system according to claim 3,
wherein the processor is further programmed to: display a working motion statistical analysis unit that calculates existence probability of the head or hand of the worker on a screen of the display upon determining a plurality of time-series of the second work events are repeated in a past predetermined period, and
display an existence probability distribution which is a distribution of the existence probabilities on a photographed result of the work site.

5. The work data management system according to claim 4,
wherein the processor is programmed to: generate a flow line history of the head or hand of the worker predetermined part based on a momentary position of the head or hand of the worker, and
superimpose and display the flow line history on the photographed result of the work site.

6. The work data management system according to claim 5,
wherein the processor is programmed to: upon determining a variance value of the plurality of flow line histories is greater than or equal to a predetermined threshold value in the second work event, display a flow line variation abnormality marker on the element of the Gantt chart corresponding to the second work event.

7. The work data management system according to claim 2,
wherein the processor is programmed to generate a working time statistical data including a median value and/or an average value of the working time required for each of the predefined second work events in the past predetermined period, and
display the second work event and the image data and display the working time statistical data.

8. The work data management system according to claim 7,
wherein the processor is programmed to: superimpose a box-and-whisker plot of the second work event on the element of the Gantt chart, based on the working time statistical data.

9. The work data management system according to claim 7,
wherein the processor is programmed to: upon determining the image data of the work site is displayed on the display unit in essentially real time, calculate a prediction completion time of a type of work including the plurality of time-series second work events based on the average value of the working time and the current time, and
superimpose a line indicating the current time on the Gantt chart and superimpose a line indicating a plan completion time of the type of work and a line indicating the prediction completion time to be superimposed and displayed on the Gantt chart.

10. The work data management system according to claim 9,
wherein the processor is configured to store a policy list in which a time difference between the plan completion time and the prediction completion time and predetermined policy information on the work in correlation with each other,
select the policy information corresponding to the time difference based on the time difference, and
display the policy information selected by the policy selection unit.

11. A work data management method executed by a processor, the method comprising:
receiving first image data of a movement of a worker in a work site;
receiving second image data of movement of the worker in the work site;
receiving information from a barcode attached to an object in a work site;
extracting first feature quantity data from the first image data and determines positions of a head of the worker in a first period of time using coordinates based on the first image data;
extracting second feature quantity data from the second image data and determines positions of a hand of the worker in a second period of time using coordinates based on the second image data;
determining that the worker is performing two or more first work events performed by the worker in the work site based on the determined coordinate positions of the head and the hand of the worker within a predetermined period of time;
determining a type of work performed by the worker in the work site based on the read information from the barcode reader;
determining, based on predefined combinations of the type of work performed by the worker and two or more first work events occurring within a predetermined amount of time, that the worker is performing one of a plurality of predefined second work events in the work site;
generating time-series of visualization data based on the determined predefined second work events that the worker is performing, the first feature quantities and the second feature quantities, the determined coordinate positions of the head, the determined coordinate positions of the hand; and
displaying the generated time-series visualization data on a display including visual representations of respective positions of the head and the hand of the worker.

* * * * *